US 8,621,756 B2

(12) United States Patent
Moler et al.

(10) Patent No.: US 8,621,756 B2
(45) Date of Patent: Jan. 7, 2014

(54) SMART MATERIAL ACTUATOR ADAPTED FOR RESONANT OPERATION

(75) Inventors: Jeffery B. Moler, Sarasota, FL (US); Aaron Dickey, Sarasota, FL (US); Lawrence Egle, Sarasota, FL (US); Daniel R. Tejada, Sarasota, FL (US)

(73) Assignee: Viking AT, LLC, Sarasota, FL (US)

( * ) Notice: Subject to any disclaimer, the term of this patent is extended or adjusted under 35 U.S.C. 154(b) by 0 days.

(21) Appl. No.: 13/203,743

(22) PCT Filed: Sep. 6, 2010

(86) PCT No.: PCT/US2010/047931
§ 371 (c)(1),
(2), (4) Date: Oct. 26, 2011

(87) PCT Pub. No.: WO2011/029081
PCT Pub. Date: Mar. 10, 2011

(65) Prior Publication Data
US 2012/0038245 A1    Feb. 16, 2012

Related U.S. Application Data

(60) Provisional application No. 61/240,001, filed on Sep. 4, 2009.

(51) Int. Cl.
*H01L 41/08* (2006.01)

(52) U.S. Cl.
USPC .......................................................... 30/328

(58) Field of Classification Search
USPC .................................... 310/317, 316.01, 328
See application file for complete search history.

(56) References Cited

U.S. PATENT DOCUMENTS

| 4,570,095 | A * | 2/1986 | Uchikawa ..................... 310/328 |
| 6,513,213 | B1 | 2/2003 | Muramatsu et al. |
| 6,520,479 | B1 | 2/2003 | Sato |
| 6,548,938 | B2 | 4/2003 | Moler et al. |
| 6,717,332 | B2 | 4/2004 | Moler et al. |
| 6,737,788 | B2 | 5/2004 | Moler et al. |
| 6,759,790 | B1 | 7/2004 | Bugel et al. |
| 6,789,087 | B1 | 9/2004 | Sako |
| 6,836,056 | B2 | 12/2004 | Oudshoorn et al. |
| 6,870,305 | B2 | 3/2005 | Moler |
| 6,924,586 | B2 | 8/2005 | Moler |
| 6,975,061 | B2 | 12/2005 | Moler |
| 6,979,933 | B2 | 12/2005 | Oudshoorn et al. |
| 7,040,349 | B2 | 5/2006 | Moler et al. |
| 7,126,259 | B2 | 10/2006 | Moler et al. |
| 7,132,781 | B2 | 11/2006 | Moler et al. |
| 7,190,102 | B2 | 3/2007 | VanderSluis |
| 7,261,352 | B2 | 8/2007 | Maslov et al. |

(Continued)

FOREIGN PATENT DOCUMENTS

| JP | 2002-058260 | 2/2002 |
| JP | 2007-006616 | 1/2007 |

*Primary Examiner* — Mark Budd
(74) *Attorney, Agent, or Firm* — William Giltinan; Carlton Fields, PA

(57) ABSTRACT

A smart material actuator having a fixed supporting member, mechanical web, actuating arm, and piezoelectric or smart material stack is disclosed, together with a sensor adapted to indicate the degree of motion of the actuating arms and controller adapted to allow safe operation of the actuator in resonant conditions. Methods of maintaining resonant operation, avoiding resonant operation, and adjusting resonant frequencies are also disclosed.

27 Claims, 12 Drawing Sheets

(56) References Cited

U.S. PATENT DOCUMENTS

| | | |
|---|---|---|
| 7,368,856 B2 | 5/2008 | Moler et al. |
| 7,564,171 B2 | 7/2009 | Moler et al. |
| 7,667,375 B2 | 2/2010 | Berkcan et al. |
| 2004/0263025 A1 | 12/2004 | Moler et al. |
| 2005/0116583 A1 | 6/2005 | Nishio et al. |
| 2006/0017349 A1 | 1/2006 | Moler et al. |
| 2008/0061031 A1 | 3/2008 | Hashiguchi et al. |
| 2010/0207411 A1 | 8/2010 | Sun et al. |

* cited by examiner

SMART MATERIAL ACTUATOR ADAPTED FOR RESONANT OPERATION

CROSS-REFERENCE TO RELATED APPLICATIONS

This application claims priority from U.S. provisional patent application Ser. No. 61/240,001 filed Sep. 4, 2009, which is herein incorporated by reference in its entirety.

BACKGROUND

The present invention relates to an actuator apparatus using a piezo or smart material and being adapted to operate at resonant frequencies. Methods of adjusting the resonant frequency of such an actuator and operating such an actuator at resonance are also disclosed.

Electrically-driven actuators are known in the art. When supplied with an alternating current, such actuators will react at a frequency that is a function of the frequency of the source current. According to the materials, mounting, and physical characteristics of their structures, such actuators will also have a frequency at which they begin to resonate when operated in such a fashion. Because operating in a resonant condition is typically seen as detrimental, in part due to the physical stress it imposes on the structure of the actuator, resonant frequencies are avoided, thereby imposing limitations on the allowable operating frequencies. The present invention addresses these shortcomings by providing an actuator apparatus that may be run effectively at resonant frequencies, a method of adjusting the resonant frequencies of such an actuator, and a method of maintaining operation of such an actuator in a resonant condition.

An actuator apparatus using a piezo or smart material and having mountable arms that enable customization of the apparatus for different applications is particularly suitable for resonant operation in part because of the fast reaction times of the piezo or smart material stack, and in part because of the ability to mount different arms allows for a degree of tuning of resonant frequencies, thereby enabling customization of the actuator for different applications.

SUMMARY

Disclosed herein, therefore, is smart material actuator adapted for resonant operation, thereby allowing for increased operational efficiency through the exploitation of the actuator's resonant characteristics. Smart material actuators suitable for use with the present invention comprise a mechanical amplifier having a fixed supporting surface and mechanical webs having a movable mounting surface. A piezoelectric stack is mounted between the first and second surfaces such that, substantially upon application of an electrical potential to the piezoelectric stack, it expands, thereby urging the second surface away from the first. The mechanical webs comprise compliant members attached to actuating arms. As the second mounting surface moves, the compliant members flex, thereby moving the actuating arm. A sensor is incorporated to indicate the degree of movement of the actuating arm or arms. A controller connected to the sensor supplies a power signal to the piezoelectric stack, causing it to activate and deactivate at a rapid rate. The controller may increase and decrease the frequency, and in some embodiments the voltage, of the power signal in response to the signal generated by the sensor. In this way, the controller can achieve and maintain operation of the actuator in a resonant condition.

Methods of maintaining and avoiding resonant operation are also disclosed. By monitoring the phase angle between the power signal and the sensor signal in some embodiments, a desired phase angle range may be used by the controller to determine what changes are needed in the power signal frequency or voltage. By adjusting the frequency of the power signal in response to changes in the phase angle, resonant operation may be maintained in changing conditions. In other embodiments, the displacement information from the sensor provides sufficient information on its own to allow the controller to maintain, or avoid, resonant operation.

Finally, methods of adjusting the resonant frequency of smart material actuators are disclosed. Such methods include adjusting mass, mounting location and the stiffness of compliant members in order to alter resonant frequencies. Embodiments of mechanical amplifiers with discrete and replaceable parts facilitate such adjustments by allowing for easy exchange of parts including, in particular, mountable actuating arms.

BRIEF DESCRIPTION OF THE DRAWINGS

Other features will become apparent from the attached drawings, which illustrate certain preferred embodiments of the apparatus and methods of this invention, wherein.

DETAILED DESCRIPTION

Preferred embodiments of the present invention are herein described with reference to FIGS. 1-18 in which distinct elements are referred to with element numbers, with similar elements in different embodiments generally having the same last two digits. By way of example therefore, while element fixed supporting member 20 is the same element used in multiple embodiments illustrated in FIGS. 1-8, sensors 154, 254, 354, 454, 554, 654, 754, and 854 illustrated in the same figures are each separate embodiments of a sensor suitable for use with different embodiments of the present invention. For convenience, therefore, when reference is made herein to a range of element numbers, that reference is a shorthand reference being made to similar elements with element numbers having the same last two digits, but different first digits. By way of example, a reference to sensors 154-854 is thus a reference to all of the embodiments of sensors 154, 254, 354, 454, 554, 654, 754, and 854. In contrast, a reference to a specific element number alone (for example a reference to sensor 154), is a reference to a specific embodiment of such element as shown in the figures, but is not necessarily a reference to other embodiments shown elsewhere in the figures (for example sensors 254, 354, 454, 554, 654, 754, and 854) unless otherwise is clear from the context. Other commonalities and differences between embodiments of similar components will be apparent to those of ordinary skill in the art from the figures and the text of this detailed description.

While the figures and the following description describe preferred embodiments of this invention, it is to be understood that the figures and description are to be considered only as illustrative of the principles of the invention and not to be limitative thereof. Numerous other variations, all within the scope of the invention as claimed, will be readily apparent to those of skill in the art.

The term "adapted" as used herein shall mean sized, shaped, configured, dimensioned, oriented and arranged as appropriate.

Where specific examples of materials, parts, frequencies, voltages, ranges, and the like are used herein, such examples are intended to be illustrative and not limiting.

The following references are hereby incorporated herein in their entirety so as to provide additional disclosure that may be found helpful in further understanding the present invention: PCT Application No. PCT/US2010/41461 and U.S. Pat. Nos. 6,717,332; 6,548,938; 6,737,788; 6,836,056; 6,879,087; 6,759,790; 7,132,781; 7,126,259; 6,870,305; 6,975,061; 7,368,856; 7,564,171 and 6,924,586.

Figure 1:
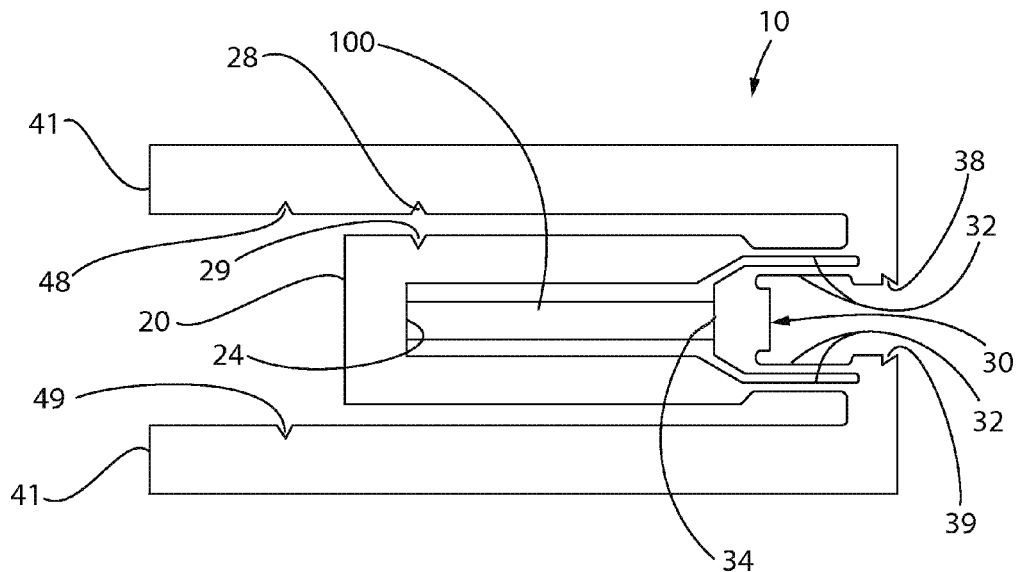
FIG. 1 shows a side view of a preferred embodiment of the mechanical amplifier of an actuator of the present invention.
Figure 2:
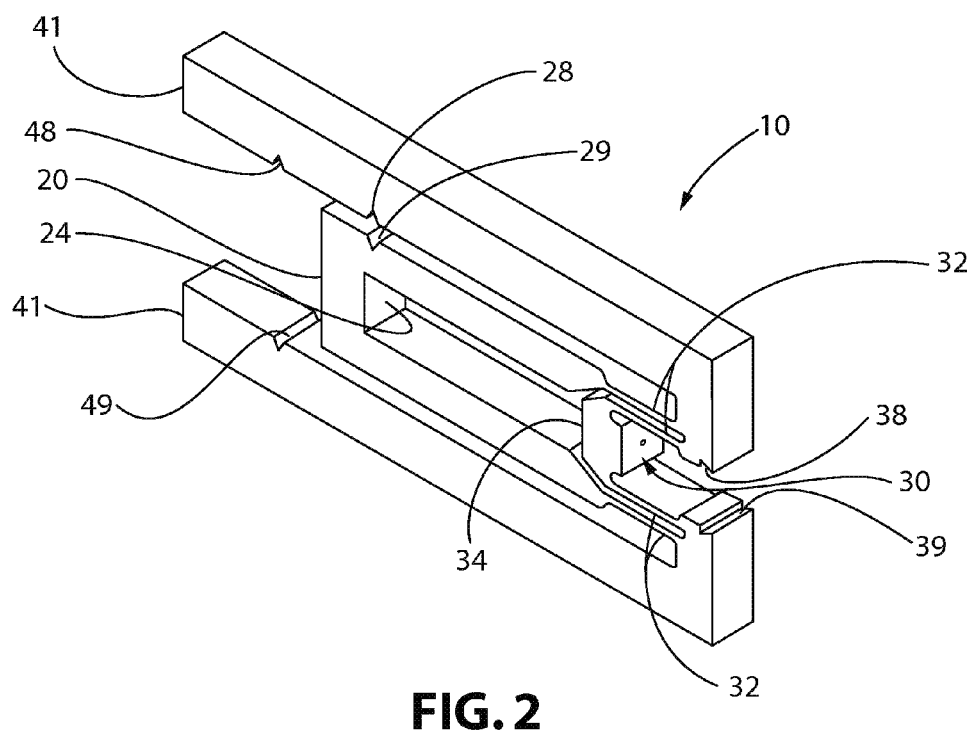
FIG. 2 shows a perspective view of the embodiment illustrated in FIG. 1 without a piezoelectric stack.

FIGS. 1 and 2 illustrate a preferred embodiment of a mechanical amplifier 10 suitable for use with a smart material actuator the present invention adapted to operate at resonance. As will be readily recognized by those of ordinary skill in the art, the components of the apparatus of the present invention may be manufactured in a variety of sizes and materials adapted to the needs of differing applications.

Mechanical amplifier 10 comprises discrete components including a fixed supporting member 20 having a first mounting surface 24. Fixed supporting member 20 may be manufactured in a variety of sizes suitable for use with piezoelectric stacks 100 of different sizes. Mechanical webs 30 have compliant members 32 attached to a movable supporting member having a second mounting surface 34. Piezoelectric stack 100 is mounted between first mounting surface 24 and second mounting surface 34 such that substantially upon application of an electrical potential to piezoelectric stack 100, piezoelectric stack 100 expands substantially without angular movement and substantially without movement of fixed supporting member 20 such that movable supporting member having second mounting surface 34 moves away from first mounting surface 24. As a result, compliant members 32 flex, thereby moving actuator arm(s) 41.

Many varieties of piezoelectric materials (materials that expand when an electric potential is applied or generate an electric charge when mechanical force is applied) are known in the art and may be adapted for use in piezoelectric stack 100, which may be, for example, a stack formed of alternating layers of ceramic piezoelectric material fired together (a so-called co-fired multilayer ceramic piezoelectric stack such as those available from suppliers including NEC) or a stack formed of layers of material cut from single crystal piezoelectric materials. As discussed herein, the term "piezoelectric stack" includes stacks of traditional piezoelectric materials and also so-called "smart materials," sometimes created by doping known piezoelectric materials to change their electrical or mechanical properties and sometimes created with formulations other than traditional PZT. Thus a smart material actuator is an actuator as described herein using a piezoelectric stack, with the term piezoelectric stack referring to both stacks made of traditional piezoelectric materials and so-called smart materials.

Mechanical webs 30 further comprise upper web sensor mounting point 38 and lower web sensor mounting point 39, discussed further below, and adapted to allow for attachment of a sensor (not illustrated in FIGS. 1 and 2), thereby allowing such sensor to sense the activation of piezoelectric stack 100 and generate a signal proportional to the movement of actuating arm(s) 41. Herein, the term "proportional" is used to describe a given mathematical relationship, but not necessarily limited to one that is defined by a straight line. Additionally, those of skill in the art will recognize that signals, while traditionally analog, may also be digital when appropriate conversion and similar circuitry is used.

An alternative sensor mounting location is provided by upper supporting member sensor mounting point 28 and lower fixed supporting member mounting point 29. As actuating arm 41 moves relative to fixed supporting member 20, a sensor between upper supporting member sensor mounting point 28 and lower fixed supporting member mounting point 29 may measure the movement of actuating arm 41.

A further alternative sensor mounting location is provided by upper arm sensor mounting point 48 and lower arm sensor mounting point 49. As actuating arms 41 move relative to each other, a sensor between upper arm sensor mounting point 48 and lower arm sensor mounting point 49 may measure the movement of actuating arms 41.

Figure 3:
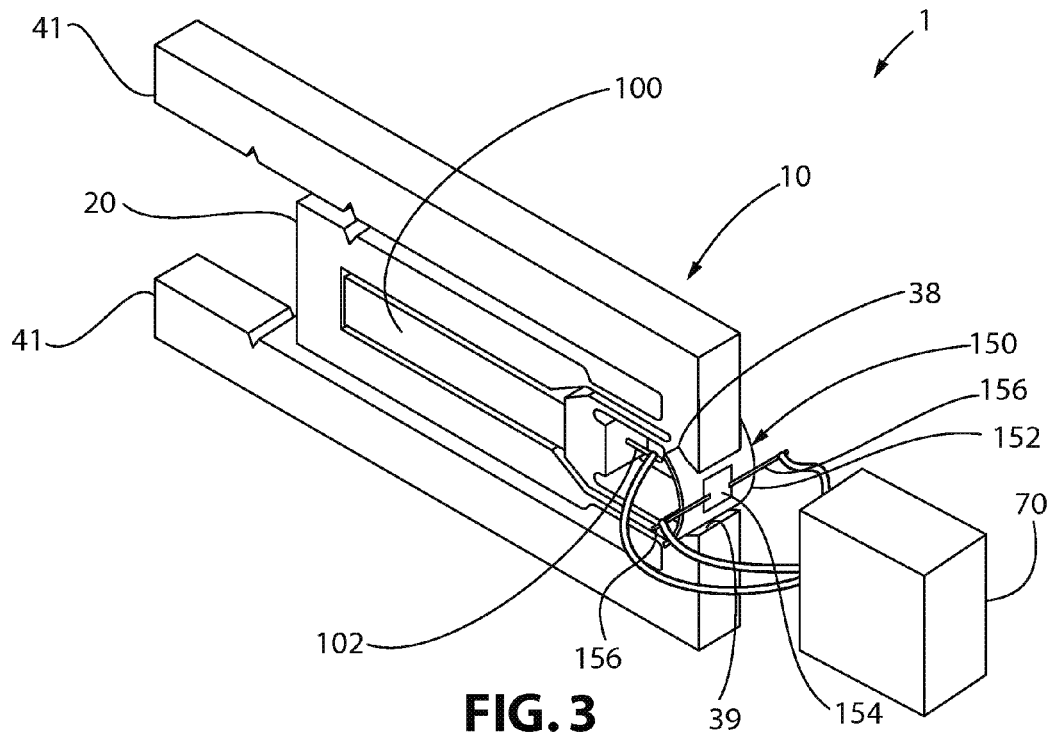
FIG. 3 illustrates a perspective view of a preferred embodiment of an actuator of the present invention having a piezoelectric stack, a sensor, and a controller shown in block form.

FIG. 3 illustrates a smart material actuator 1 adapted for resonant operation according to the present invention. In addition to mechanical amplifier 10 and piezoelectric stack 100, actuator 1 comprises sensor assembly 150 electrically connected to controller 70. Controller 70 is further electrically connected to electrode 102 of piezoelectric stack 100, which passes through second mounting surface 34 of mechanical webs 30, with insulation (not illustrated) adapted to prevent an electrical connection between electrode 102 and the remainder of mechanical amplifier 10. Controller 70 is further electrically connected to, or comprises internally, a power supply (not illustrated), thereby enabling controller 70 to activate and deactivate piezoelectric stack 100, and thereby actuator 1, by applying a power signal to piezoelectric stack 100. As is understood by those of ordinary skill in the art, the power signal will be an alternating current having a frequency and a voltage. By increasing and decreasing the frequency of the power signal, controller 70 may increase and decrease the frequency of operation of actuator 1. As is discussed further below, sensor assembly 150 is adapted to generate an electric signal proportional to the degree of movement of mechanical webs 30, and thereby actuating arms 41, to controller 70, thereby enabling controller 70 to monitor the degree of movement actually generated by the application of the power signal.

A wide variety of sensor embodiments may be used to generate a signal proportional to the degree of movement of actuating arm(s) 41. One such embodiment is illustrated as sensor assembly 150, in which a sensor 154 having terminals 156 is mounted to a compliant backing material 152. Compliant backing material 152 may be formed from any material with sufficient resilience to avoid yielding under repeated activations of piezoelectric stack 100, such as, without limitation, a thin sheet of stainless steel or spring steel. Sensor 154 is adapted to measure the flexing of compliant backing material 152. The greater the degree of movement of actuating arm(s) 41, the greater the resulting flex of compliant backing material 152. Sensor 154 may be any of a variety of sensors capable of detecting strain or flex that are known in the art including, without limitation, foil-type strain gauges mounted on a metal backing, piezo sensors (such as, without limitation, the DigiKey MSP1007-ND and MSP6915-ND), capacitive strain gauges (such as those available from Analog Devices including without limitation the AD7745 capacitance to digital converter), optical sensors (such as the Vishay TCRT1000 reflective optical sensor), Hall effect sensors (such as the Melexis MLX90242 CMOS linear hall effect sensor IC), a piezo variable voltage sensor, or an accelerometer. It will be understood by those in the art that different types of sensors may require different mounting locations and mounting means, as well as different control circuitry to convert their sensor signals into reliable indications of the degree of movement of actuating arm(s) 41.

As illustrated, compliant backing 152 is inserted between upper web sensor mounting point 38 and lower web sensor mounting point 39. Where compliant backing material 152 is a pre-flexed sheet of compliant material such as a thin sheet of spring steel, upper web sensor mounting point 38 and lower web sensor mounting point 39 may conveniently be formed as opposing angled notches proximal to compliant members 32 as shown. As will be easily understood by those of ordinary skill in the art, a variety of other means may also be utilized to attach compliant backing material 152 including, without limitation, mechanical fasteners such as bolts, adhesives, and welding. Additionally, if sensor 154 is adapted to detect compression as opposing to flex, compliant backing 152 may be replaced by complaint posts (not illustrated) aligned substantially perpendicular to piezoelectric stack 100 such that sensor 154 is released and compressed substantially upon activation and deactivation of actuator assembly 1. A single layer piezoelectric stack would be a suitable sensor in such a configuration. As the electric signal generated by sensor 154 is proportional to the movement of mechanical webs 30, and thereby actuation arm(s) 41, sensor assembly 150 is adapted to indicate the degree of movement of actuating arm(s) 41.

Figure 5:
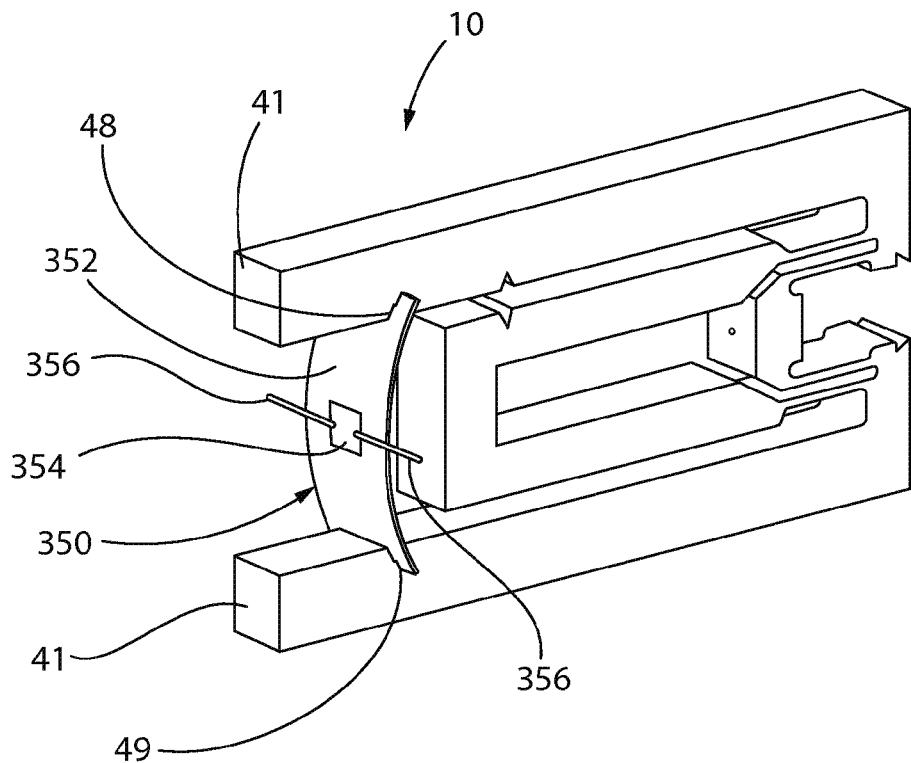
FIG. 5 illustrates a perspective view of a preferred embodiment of a mechanical amplifier of an actuator of the present invention having a sensor attached to a compliant backing mounted between two actuating arms.
Figure 6:
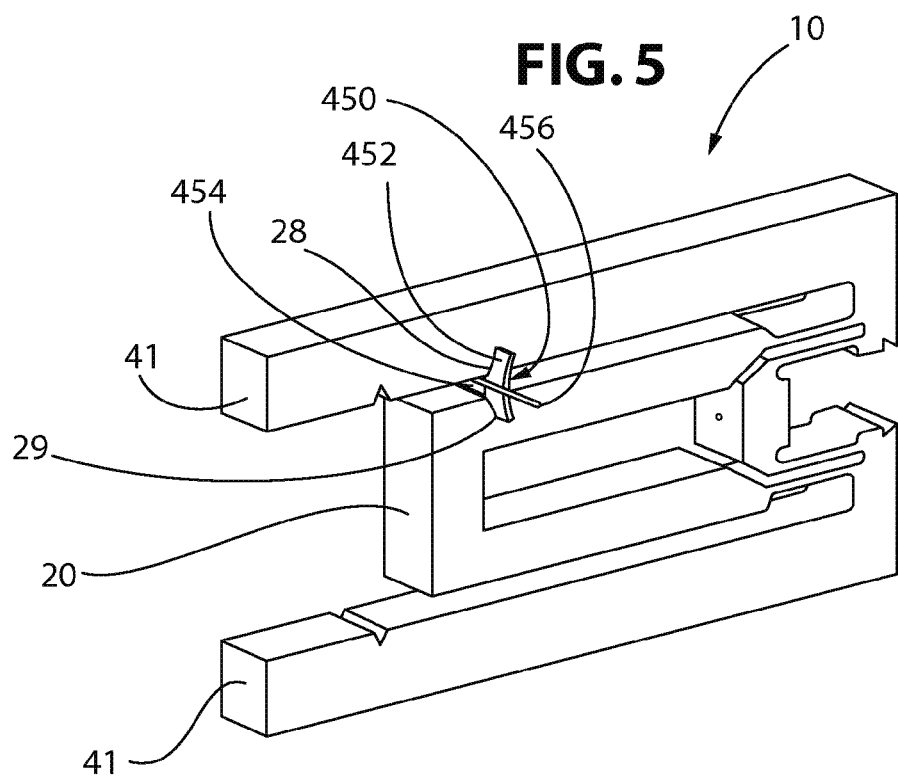
FIG. 6 illustrates a perspective view of a preferred embodiment of a mechanical amplifier of an actuator of the present invention having a sensor attached to a compliant surface mounted between a first actuating arm and a fixed supporting member.

FIGS. 5 and 6 illustrate alternative embodiments of sensors 354, 454 suitable for use with the present invention. As illustrated in FIG. 5, sensor assembly 350 is made up of sensor 354 on compliant backing material 352 with terminals 356. Compliant backing material 356 is mounted between upper arm mounting point 48 and lower arm mounting point 49 as illustrated. It will be apparent to those of skill in the art that other means of attachment, including without limitation mechanical fasteners, may be used as mounting points for compliant backing material 352 in addition to the angled notch mounting means illustrated. As actuating arms 41 move toward and away from one another during operation, compliant backing material 352 flexes and releases, thereby allowing sensor 354 to determine the strain or flex in compliant backing material 352 and, hence, the degree of motion of actuating arms 41.

Alternatively, referring to FIG. 6, sensor assembly 450 may be mounted between fixed supporting member 20 at supporting member lower mounting point 29 and actuating arm 41 at supporting member upper mounting point 28. Like sensor assemblies 150, 350, sensor assembly 450 comprises a compliant backing material 452 on which sensor 454 is mounted, with electrodes 456 extending therefrom. During operation, actuating arm 41 moves downward, flexing compliant backing material 452 and upward, allowing compliant backing material 452 to relax, but not to the point of being entirely slack. As with the previously described embodiments, the strain in compliant backing material 452 is indicated by sensor 454, thereby generating a signal proportional to the degree of movement of actuating arm 41. The materials, including sensors 354, 454, that may conveniently be used with sensor assemblies 350 and 450 are the same as those described in connection with sensor assembly 150 above.

Figure 4:
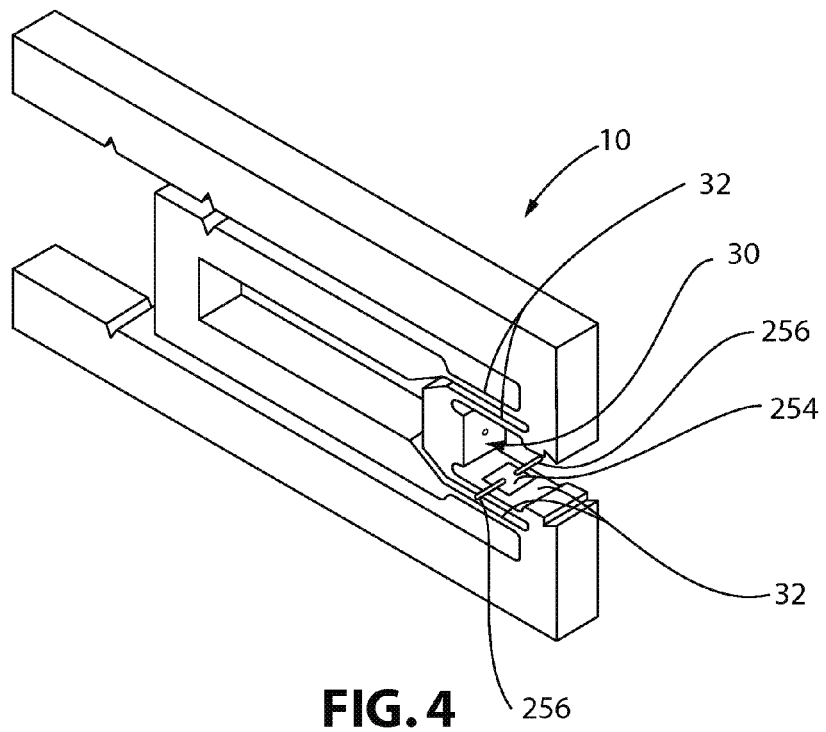
FIG. 4 illustrates a perspective view of a preferred embodiment of a mechanical amplifier of an actuator of the present invention having a sensor attached to a compliant member of a mechanical web.

Referring now to FIG. 4, a further sensor embodiment may be described. As noted above, during operation, compliant members 32 of mechanical web 30 flex, thereby moving actuating arm(s) 41. Just as a sensors 154, 354, 454 may be mounted on, and indicate the strain of, compliant backing materials 152, 352, 452 as they are flexed and relaxed as actuating arm(s) 41 move, sensor 254 may be mounted directly on compliant member 32 and indicate its strain during operation. This also will provide a signal proportionate to the degree of movement of actuating arm(s) 41. The same types of sensors may be used for sensor 254 as are appropriate for use with sensors 154, 354, 454. The primary difference being that, whereas sensors 154, 354, 454 sense the strain of backing materials 152, 352, 452, sensor 254 senses the strain of compliant members 32.

Figure 7:
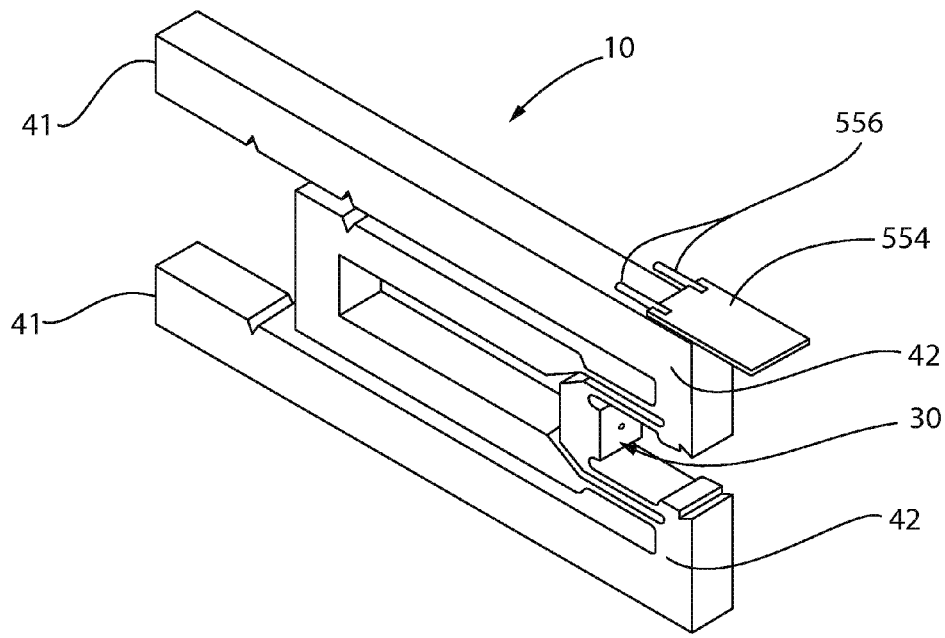
FIG. 7 illustrates a perspective view of a preferred embodiment of a mechanical amplifier of an actuator of the present invention having a sensor attached proximal to the connection between an actuating arm and a mechanical web.
Figure 8:
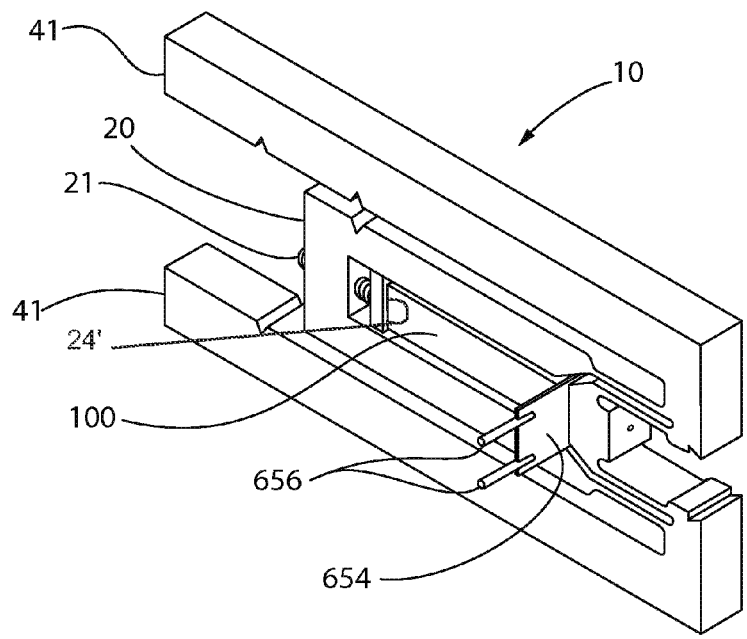
FIG. 8 illustrates a perspective view of a preferred embodiment of an actuator of the present invention having a sensor affixed between the piezoelectric stack and the second mounting surface.

FIGS. 7 and 8 illustrate further configurations and embodiments of sensors 554 and 654 appropriate for use with the present invention. Sensor 554 with terminals 556 is fixedly attached to the back end of actuating arm 41 proximal to its connection with mechanical web 30. Sensor 554 extends, however, into space, thereby allowing it to flex as actuating arm 41 moves. By indicating the degree of flex, sensor 554 thereby indicates the degree of movement of actuating arm 41.

Similarly, sensor 654 with terminals 656 is attached between piezoelectric stack 100 and second mounting surface 654 with one end also extending into space. As piezoelectric stack 100 expands and contracts, sensor 654 indicates the degree of flexing and, therefore, the degree of movement of piezoelectric stack 100, which will be proportionate to the degree of movement of actuating arm(s) 41.

It will be readily understood by those of skill in the art that actuator 1 may be activated and deactivated in rapid succession by adapting controller 70 to apply a power signal of appropriate voltage and frequency to piezoelectric stack 100. When operated in such a manner, actuator 1 will achieve natural resonance at frequencies determined by its mass, materials, and other properties. When the actuator achieves resonance, the displacement (or stroke) of its operation will increase even as the energy applied to piezoelectric stack 100 is maintained at a substantially constant level. Accordingly, the energy required to achieve a particular displacement when actuator 1 is operated in a resonant condition will be less than the energy required to achieve the same displacement when it is operated in a non-resonant condition.

Figure 14:
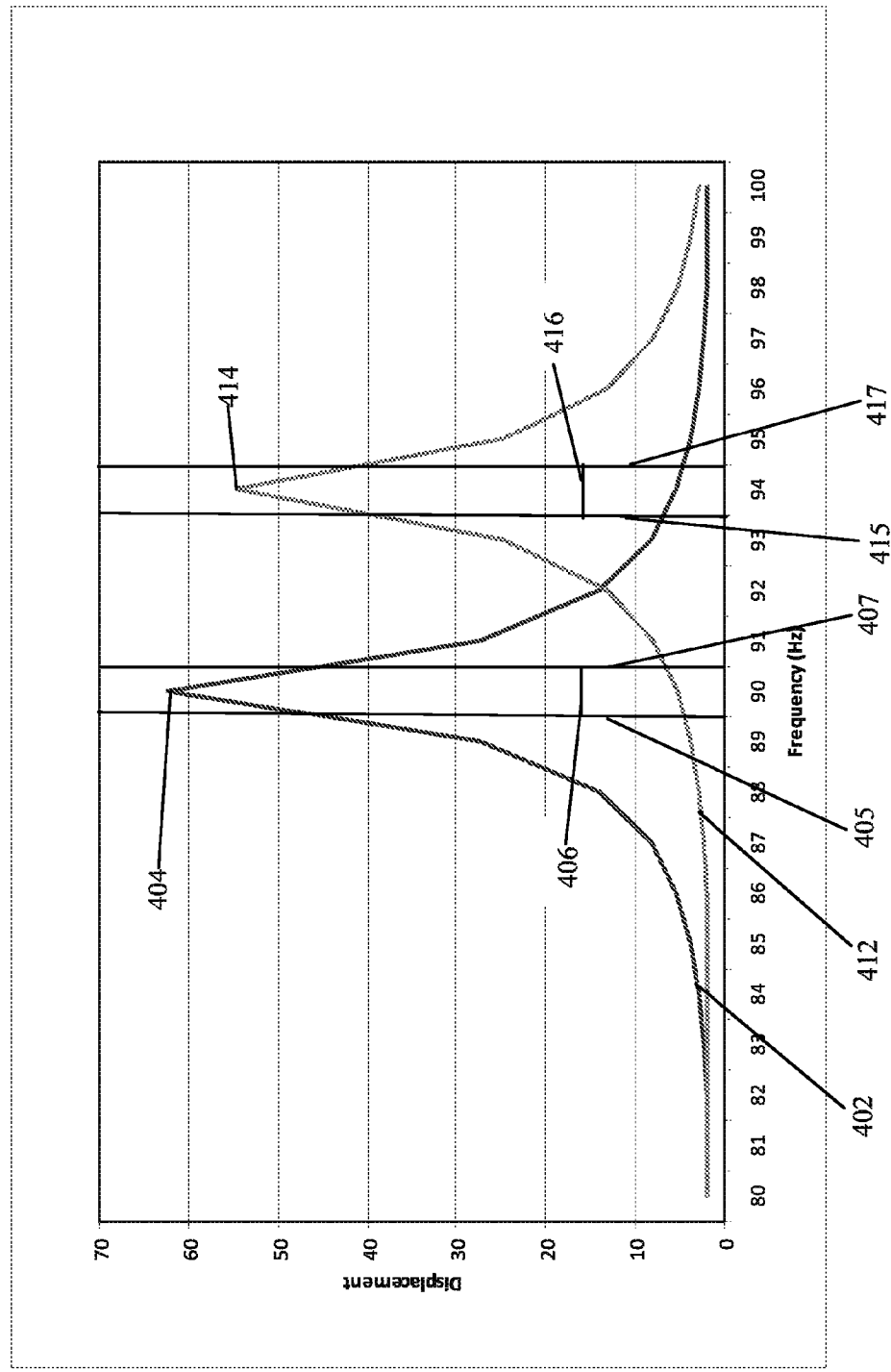
FIG. 14 is a graphical depiction of relationships among frequency and displacement at a substantially fixed voltage around ranges of resonant operation.

Referring to FIG. 14, the relationship between displacement and frequency can be understood by plotting the displacement of an actuator arm 41 against the frequency of activation, while voltage is maintained at a substantially constant level. Plot 402 illustrates a representative relationship between frequency and displacement when a smart material actuator 1 adopted for use with the current invention is operated with a minimal or no load, meaning that the actuator arm(s) 41 are either not attached to any external load, or are attached to a minimal load such as a pump not operating at pressure due to a flow restriction. Plot 402 has a peak displacement occurring substantially at point 404. The frequency at point 404 is referred to herein as the natural resonant frequency as it indicates the highest expected displacement when the actuator 1 is operated without a meaningful load. As is clear from plot 402, displacement peaks rapidly within a given range of frequencies. The rapid increase and decrease in displacement about the natural resonance frequency at point 404 occurs due to resonant characteristics of smart material actuator 1. Accordingly, if the desired range of operational displacement is predetermined, based for example and without limitation on the displacement required to drive a compressor shaft, it is possible to determine the frequencies at which the range of desired displacement will occur near, and preferably substantially centered around, the natural resonant frequency, as is shown by representative resonant operation range 406, which begins at the natural resonant frequency range lower bound 405 and ends at natural resonant frequency range upper bound 407. It will be understood by those of ordinary skill in the art that the placement of natural resonant frequency range lower bound 405 and natural resonant frequency range upper bound 407 will be a matter of choice dependent on the particular application, which will dictate the range of displacements necessary for efficient operation of whatever load is to be actuated by actuating arm(s) 41. Accordingly, in some applications natural resonant frequency range 406 will be select to be narrower than in other applications.

Plot 412 illustrates the relationship between frequency and displacement when the same actuator 1 is operated with a constant load applied to actuator arm(s) 41. As illustrated in plot 412, the point of maximum displacement occurs substantially at point 414, which occurs at a frequency referred to herein as the loaded resonant frequency, with the loaded resonant operation range being shown by frequency range 416. Loaded resonant frequency range 416 is bounded by loaded resonant frequency range lower bound 415 and loaded resonant frequency range upper bound 417. A number of relationships are apparent from plots 402 and 412, including that loaded resonant frequency range 416 will be both higher and narrower than natural resonant frequency range 406. Also apparent is that, when the voltage is maintained at a substantially constant level, the peak displacement occurring at the loaded resonant frequency indicated by point 414 will be lower than the displacement occurring at the natural resonant frequency indicated by point 404.

Figure 15:
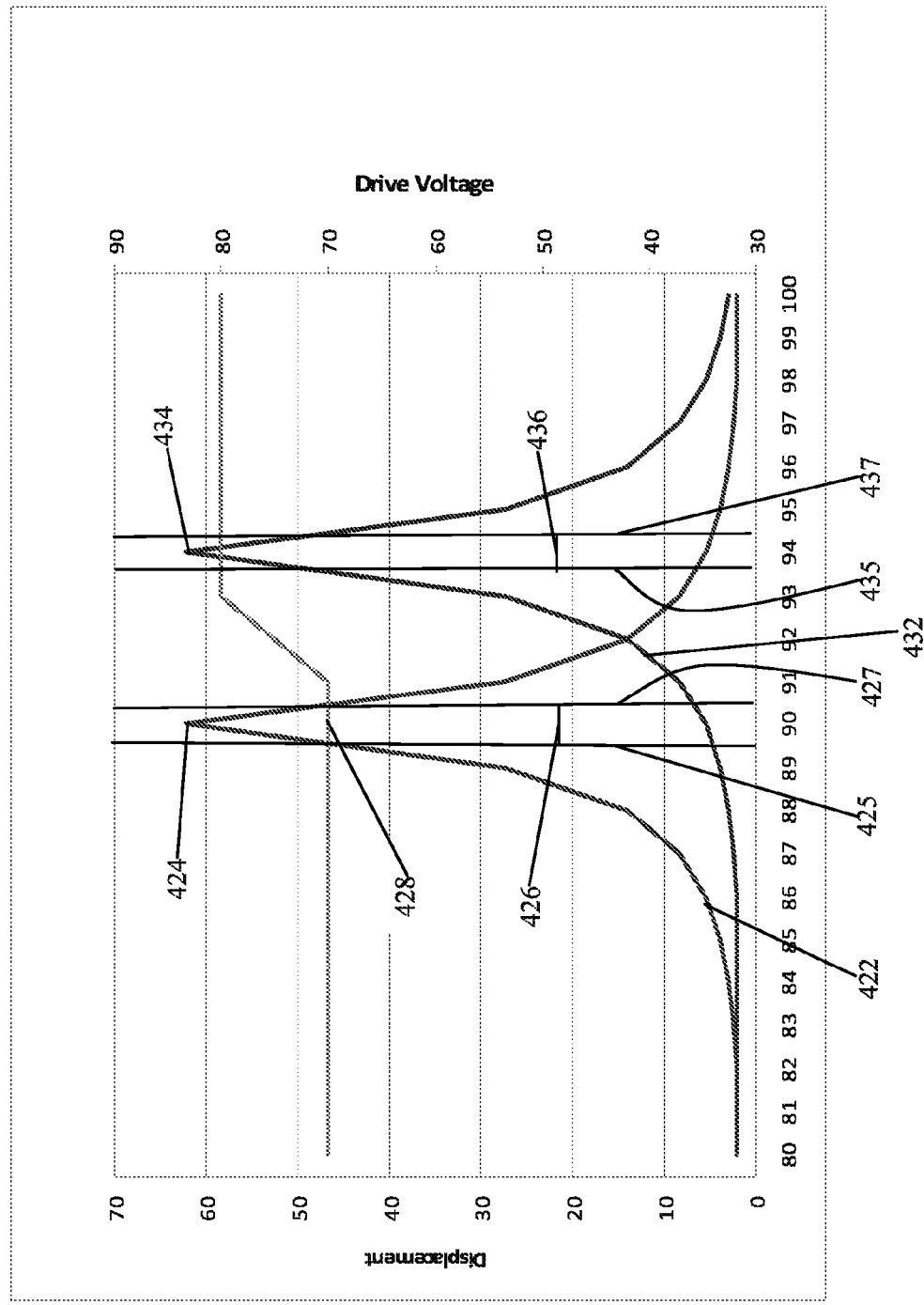
FIG. 15 is a graphical depiction of relationships among frequency and displacement with voltages varied to maintain a given peak displacement during resonant operation.

FIG. 15 illustrates the relationships between frequency and displacement of loaded and unloaded actuators 1 when voltage is varied according to load. Plot 422 illustrates the relationship between frequency and displacement of a smart material actuator 1 having no external load attached to actuator arm(s) 41 at voltage levels indicated by plot 428. The natural resonant frequency in plot 422 is indicated by point 424 with natural resonant frequency range 426 being bounded by natural resonant frequency range lower bound 425 and natural resonant frequency range upper bound 427. Plot 432 illustrates the relationship between frequency and displacement of a smart material actuator 1 having a substantially constant load attached to actuator arm(s) 41, also at voltage levels indicated by plot 428. The loaded resonant frequency in plot 432 is indicated by point 434 with loaded resonant frequency range 436 being bounded by loaded resonant frequency range lower bound 435 and loaded resonant frequency range upper bound 437. As is shown by plot 428, voltage levels may be increased to achieve comparable displacement at the natural resonant frequency indicated by point 424 and the loaded resonant frequency indicated by point 434. Therefore, by varying voltage in addition to frequency, the advantage of the increased stroke occurring at resonant frequencies can be maintained across different load levels. Varying the voltage also assists in minimizing the difference between the width of natural resonant frequency range 426 and loaded resonant frequency range 436. While plots 422 and 432 demonstrate the relationship between load and frequency around resonant ranges 426 and 436 respectively, they are not necessarily reflective of the displacement levels outside of those ranges when the voltage is varied.

Given the basic relationships between resonant frequency, load, displacement and voltage described above, it will be apparent to those of ordinary skill in the art that it is possible to adapt a smart material actuator 1 capable of variable frequency operation such that it may operate more efficiently by maintaining a resonant condition, meaning that it is operating within the loaded resonant frequency range 416, 436 corresponding to the load attached to actuator arm(s) 41 at a given time. As the displacement generated by a given voltage when a smart material actuator 1 is operated in a resonant condition is greater than the displacement generated by the same voltage when it is not, it is apparent that greater efficiencies can be achieved my maintaining a resonant condition.

Because the dramatic increase in displacement at resonant frequencies can cause compliant members 32 to flex to the point of yielding (meaning that they either do not return substantially to their pre-flexed position or lose resilience to flexing to a significant degree), resonant operation has been avoided in the prior art. One reason the prior art has avoided resonant operation is that resonant frequencies tend to be dynamic, varying significantly based on a variety of factors that are constantly changing in real world applications, thereby making it difficult to maintain a resonant condition even when a safe voltage is used. For example, and without limitation, if an actuator 1 is utilized to drive a pump (not illustrated), the load applied to actuator arm(s) 41 will vary based on constantly changing factors such as backpressure, viscosity changes, and turbulence in the stream. Prior to the present invention, were an actuator driving such a pump to operate at resonance, and the loaded resonant frequency to change due to dynamic conditions, the actuator 1 would quickly "bog down," because the energy required to drive the pump at resonance would likely be insufficient to drive the pump at non-resonant frequencies. Similarly, were the same actuator to operate near, but outside, resonance, then a change in dynamic conditions causing the resonant frequency of the actuator to match the frequency of operation could cause a rapid increase in displacement, thereby causing damage. For example, damage could occur to a smart material actuator otherwise suitable for use with the present invention if the displacement experienced during resonant operation caused compliant members 32 of mechanical webs 30 to "overextend" to the point that compliant members 32 exceed their yield points. This can happen easily when resonant operation occurs unexpectedly at too high a voltage level absent the present invention. In such situations, voltage levels are likely too high because higher voltage was required to generate useful displacement prior to entering resonant operation. When that same voltage is maintained and the increased displacement of resonant operation occurs, the yield point is exceeded and either compliant members 32 cease to operate correctly or piezoelectric stack 100 fails due to flexing or operation without sufficient compressive forces. One of the improvements offered by the present invention, therefore, is a means of achieving the benefits of resonant operation by allowing smart material actuator 1 to maintain resonant operation in varying conditions. To do so, however, it is necessary that controller 70 be adapted to react to changes in loaded resonant ranges 416, 436 during operation.

Figure 17:
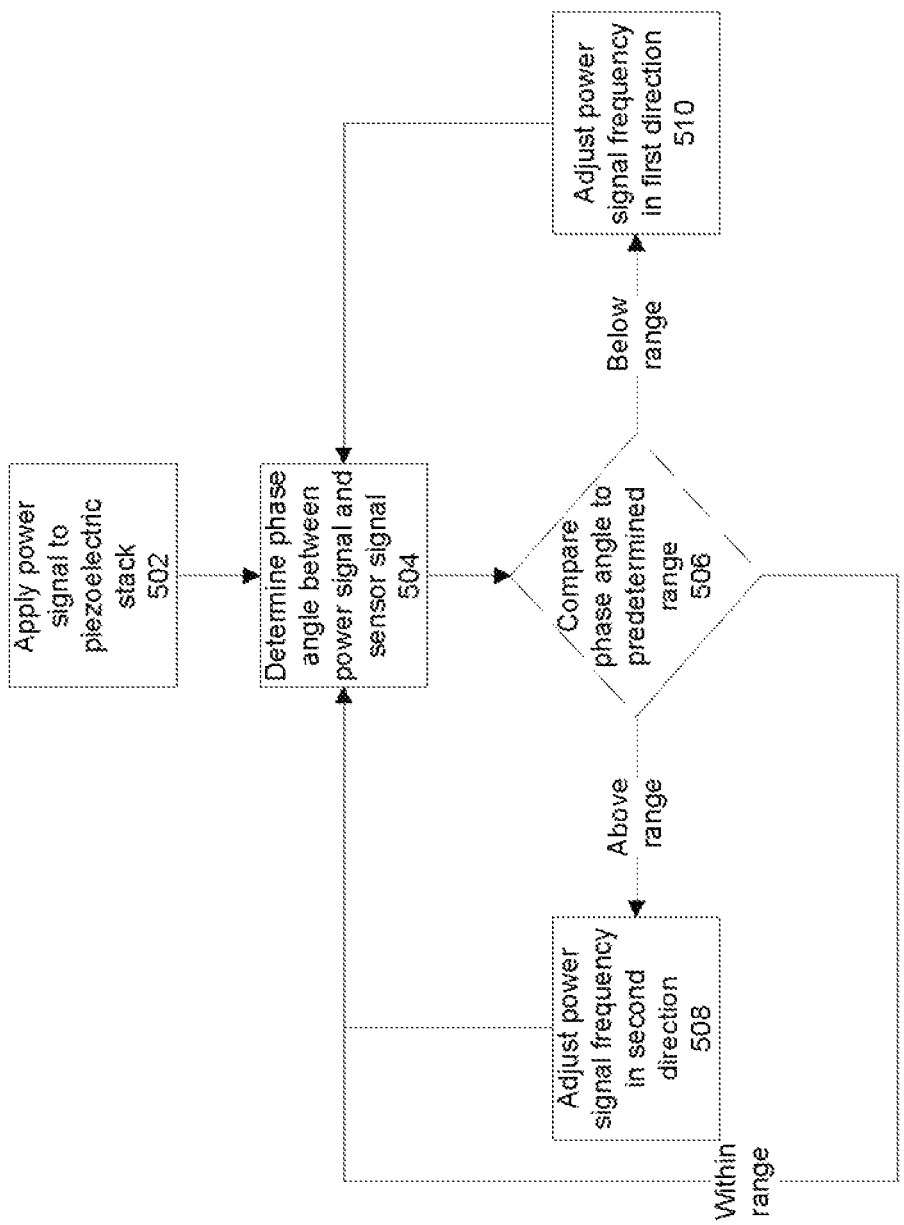
FIG. 17 is a flow chart illustrating steps of an embodiment of a method of operating a smart material actuator in a resonant condition utilizing phase angle differences.

One technique for doing so is illustrated by the flowchart of FIG. 17. Controller 70 is an electronic control circuit electrically connected to piezoelectric stack 100 and sensor 154-854. Controller 70 is adapted to apply a power signal having a power signal voltage (meaning the alternating current voltage applied to the piezoelectric stack) and a power signal frequency (meaning the frequency of the alternating current being applied to the piezoelectric stack) to piezoelectric stack 100 through stack terminal 102. It will be understood by those of skill in the art that only stack one terminal 102 is required if controller 70 and piezoelectric stack 100 share a common ground or reference. The alternating current nature of the power signal will cause actuator 1 to activate and deactivate approximately at the same frequency as the power signal frequency. Controller 70 receives a sensor signal (meaning a dynamic electrical current or corresponding digital data) from sensor 154-854. Sensor 154-854 is adapted such that sensor signal 70 will be proportionate to the degree of movement (or displacement) of actuating arm(s) 41. One such embodiment is illustrated in FIG. 3 in which sensor assembly 150 comprises compliant backing material 152 affixed between upper web attachment point 38 and lower web attachment point 39, and sensor 154 affixed thereto. Terminals 156 are electrically connected to sensor 154 and to controller 70. As actuator 1 activates and deactivates, lower web attachment point 39 and upper web attachment point 38 will move away from, and then toward, on another, thereby alternately relaxing and flexing backing material 152, with greater and lesser degrees of flex and release corresponding to greater and lesser degrees of movement of actuator arm(s) 41. Sensor 154 is adapted to generate an electrical signal corresponding to the strain or flex applied to compliant backing material 152. In this way, sensor 154 generates a sensor signal proportionate to the degree of movement of actuating arm(s) 41. As discussed above, FIGS. 4-7 illustrate alternate embodiments of sensors 254-554 mounted in different locations but capable of similar operation.

Figure 16:
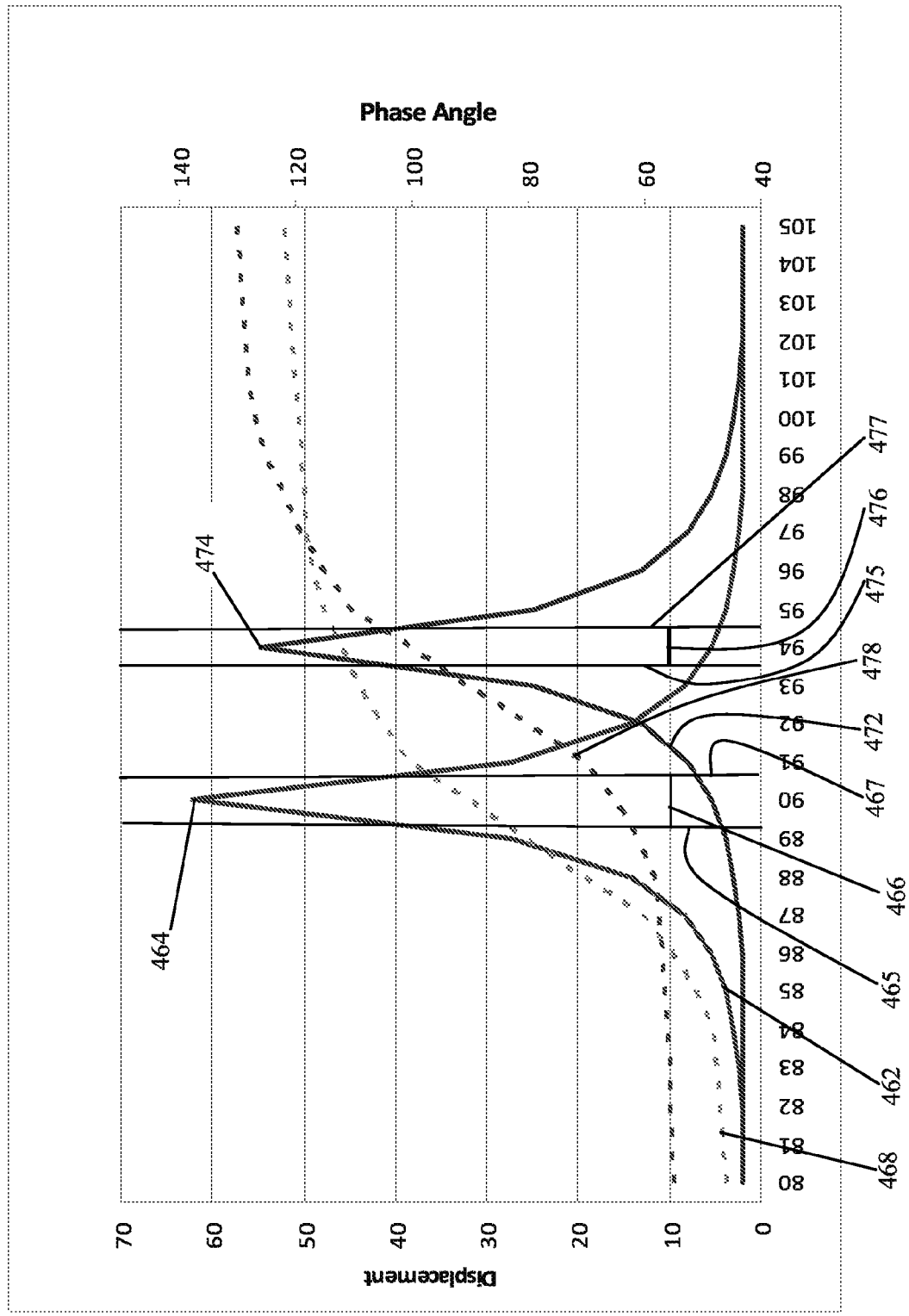
FIG. 16 is a graphical depiction of relationships among frequency, displacement, and phase angle at a substantially fixed voltage around ranges of resonant operation.

Referring to FIGS. 3, 16 and 17, controller 70 is adapted to determine the phase angle between the power signal and the sensor signal. Plot 468 illustrates a relationship between phase angle, displacement (also referred to herein as degree of movement of actuating arm(s) 41), and power signal frequency. As shown by plot 468, when no load is applied to actuating arm(s) 41, the phase angle increases as frequency increases, thus illustrating that the expected phase angle for any given frequency can be determined. In this way, a predetermined phase angle range can be calculated by determining the phase angles at the power signal frequencies indicated by points 465 (indicating entry of natural resonant operation) and 467 (indicating exit of natural resonant operation). The natural resonance phase angle will be the phase angle at peak resonance and the predetermined phase angle range should be such that the natural resonance phase angle is within, and preferably substantially centered within, the predetermined phase angle range. As phase angle changes relatively quickly in and around the predetermined phase angle range; controller 70 can sense and react quickly to changes that cause actuator 1 to enter and leave resonant operation. As illustrated in FIG. 17, controller 70 can take advantage of these relationships by first applying the power signal to piezoelectric stack 100 in step 502. Controller 70 then determines the phase angle in step 504 and compares it to the predetermined phase angle range in step 506. If the phase angle is below the phase angle range, power signal frequency is adjusted in a first direction in step 510. If it is above the predetermined phase angle range, the power signal frequency is adjusted in a second direction in step 508. If the phase angle is within range, change in power signal frequency is not required. By repeating this process, resonant operation may be maintained or recaptured if lost through reference to the phase angle.

Plot 462 in FIG. 16 illustrates the relationship between displacement and power signal frequency of an unloaded actuator, with point 464 representing the actuator's natural resonant frequency. Plot 472 illustrates the relationship between displacement and power signal frequency of an actuator under load with loaded resonant frequency represented by point 474. As illustrated, the predetermined phase angle range when actuator 1 is loaded (occurring at frequencies between those indicated by points 475 and 477) may be different from the predetermined phase angle range when actuator 1 is unloaded (occurring at frequencies between those indicated by points 465 and 467). This relationship can be seen by comparing plots 468 (phase angle under no load) and 478 (phase angle under a constant load). The change in predetermined phase angle range, however, between loaded and unloaded states is understood to be easily approximated by a linear function. Accordingly, as load increases and decreases, the predetermined phase angle range may be shifted incrementally to compensate. Controller 70 may determine load based on the sensor signal as described above (which is proportionate to the degree of movement of arms 41 which degree will vary with load at a given voltage), or by other means apparent to those of skill in the art. In this way, by tracking the predetermined phase angle and adjusting the power signal frequency to maintain the actual phase angle within the predetermined phase angle range, controller 70 can maintain resonant operation of actuator 1 in changing conditions.

As is discussed further below, the natural resonant frequency 464, loaded resonant frequency 474 and their corresponding phase angles can change substantially depending on actuator design, application, and sensor location. Accordingly, whereas controller 70 will increase frequency (the first direction) upon determining the actual phase angle is below the predetermined phase angle range, and will decrease the frequency (the second direction) upon determining the actual phase angle is above the predetermined phase angle range where the relationships are as indicated in FIG. 16, those directions could be reversed given different configurations. Accordingly, some initial measurement or calculation may be required to determine the predetermined phase angle ranges and the directions of adjustment to be used by controller 70 in a given application. It will also be understood that the breadth of natural resonant frequency range 466 and loaded resonant frequency range 476 will also vary according to application with the ranges sometimes being wider and other times being narrower than shown on the figures.

In making changes to power signal frequency, the amount of the change needed can vary depending on how close, or far away, actuator 1 is from resonant operation. Accordingly, it is preferred to adjust the power signal frequency in increments proportional to the difference between the determined phase angle and the natural resonance phase angle. In this way, the farther outside the predetermined phase angle range the actual phase angle is determined to be, the greater the frequency adjustment that will be applied. To avoid overcompensation, however, it is preferred to have a maximum frequency increment. This helps prevent overcompensation and smoothes the frequency response of controller 70. The maximum frequency increment will vary based on application and the speed of controller 70.

Furthermore, as has been discussed above, it may be desirable to maintain a consistent displacement of actuating arm(s) 41 across different loads. When utilizing the method illustrated in FIG. 17, this can be accomplished by adapting controller 70 to increase the power signal voltage substantially upon determining that the measured phase angle is within the predetermined phase angle range when the degree of movement is below a predetermined movement lower bound. In other words where controller 70 is maintaining resonant operation, but actuator 1 is not generating the minimum required displacement, controller 70 can increase the power signal voltage. Similarly, substantially upon determining that the measured phase angle is within the predetermined phase angle range, and that the degree of movement is above a predetermined movement upper bound, controller 70 can reduce the power signal voltage, thereby reducing the risk of extending mechanical webs 30 beyond their yield points.

Figure 9:
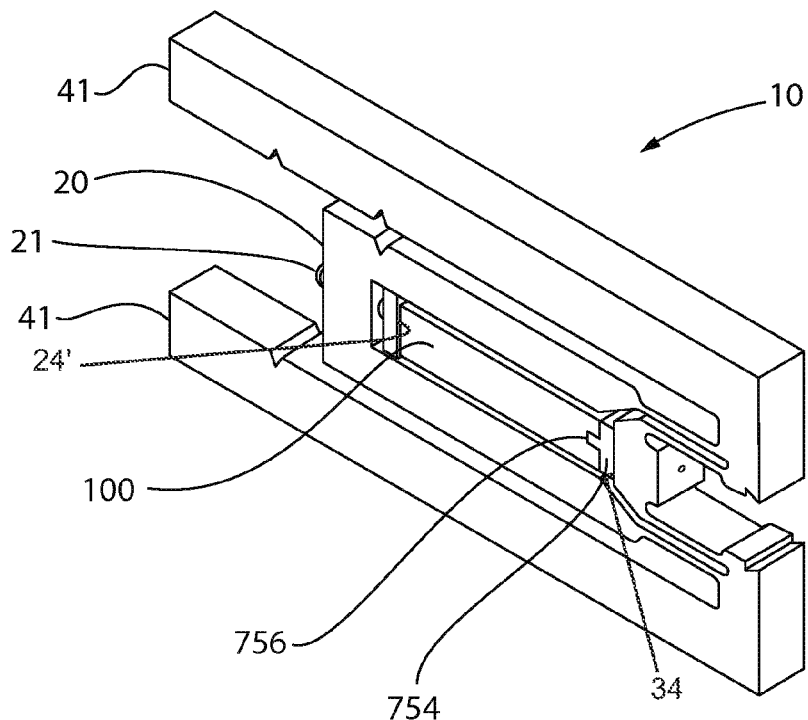
FIG. 9 illustrates a perspective view of a preferred embodiment of an actuator of the present invention having an electrically isolated single layer piezoelectric stack adapted to act as a sensor on one end of the piezoelectric stack.
Figure 10:
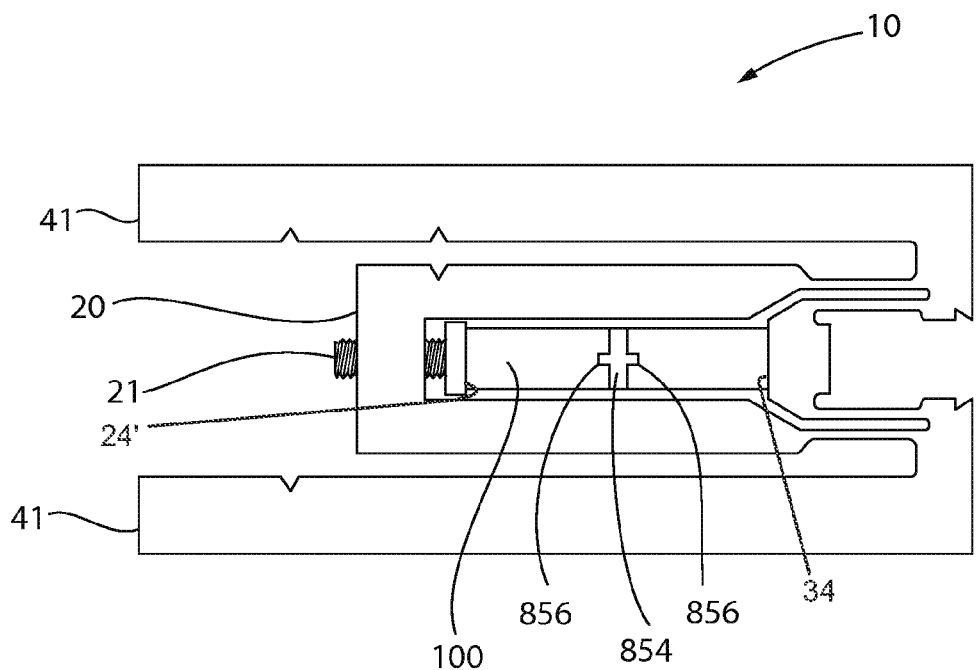
FIG. 10 illustrates a perspective view of a preferred embodiment of an actuator of the present invention having an electrically isolated piezoelectric layer adapted to act as a sensor within the piezoelectric stack.

In addition to maintaining resonant operation by measurement of phase angle, it is also possible to maintain resonant operation by measuring the degree of movement of actuating arm(s) 41 without phase angle information. While this method may be used with any sensor location suitable to allow a sensor to provide a sensor signal proportional to the degree of movement of actuating arm(s) 41, it is preferred in applications where sensors 654-854 (illustrated on FIGS. 8-10) are positioned in line with piezoelectric stack 100. More particularly, as illustrated in FIG. 8, a sensor 654, such as those sensors described above, having terminals 656 may be mounted between piezoelectric stack 100 and second mounting surface 34. As piezoelectric stack 100 expands and contracts, the strain on sensor 654 will be proportional to the degree of movement of actuating arm(s) 41. Applying the same principal, sensor 754 may be a single layer or multi-layer piezoelectric stack may be mounted in line with, but electrically isolated from, piezoelectric stack 100 as illustrated in FIG. 9, either adjacent to second mounting surface 34 (not shown in FIG. 9) as illustrated, or adjacent to first mounting surface 24' (not shown in FIG. 9). As is understood, such stacks, whether single layer or multi-layer, can be used as sensors by generating a sensor signal according to the mechanical force applied to them, in addition to acting as drivers as has been discussed in connection with the description of piezoelectric stack 100. As is illustrated in FIG. 10, it is also possible for a section of piezoelectric stack 100 to be adapted to act as sensor 854 by electrically isolating it from the remainder of the stack and providing separate inline sensor terminals 856 for electrical connection to controller 70.

Figure 18:
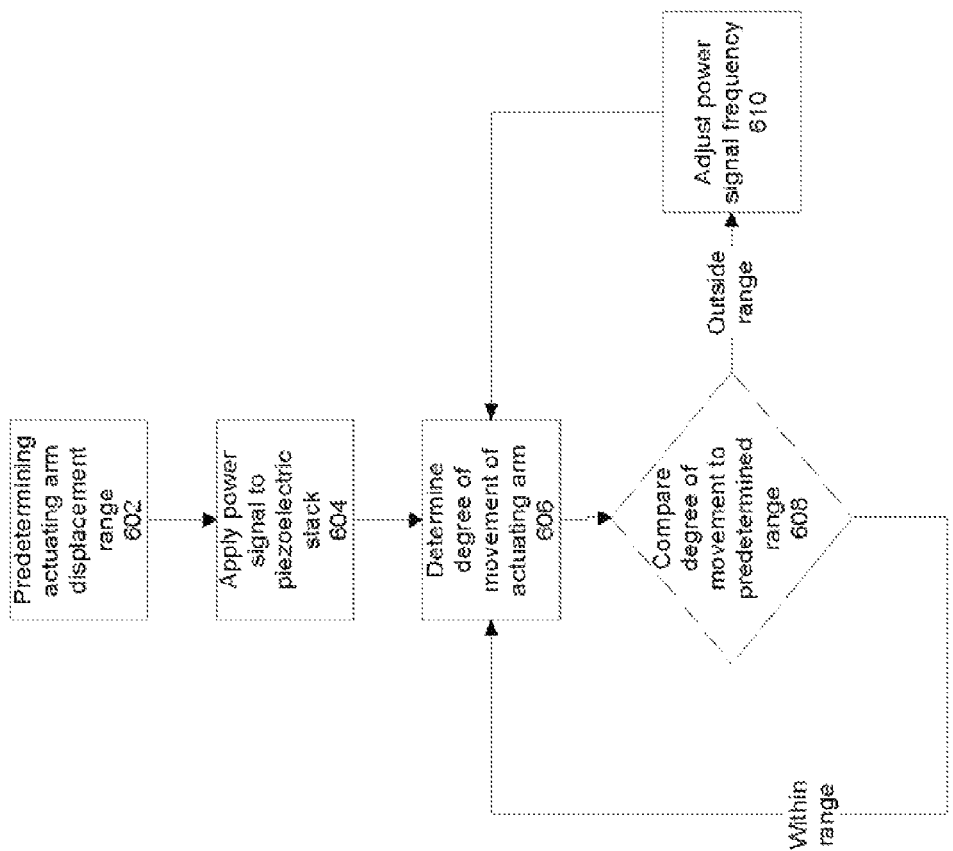
FIG. 18 is a flow chart illustrating steps of an embodiment of a method of operating a smart material actuator in a resonant condition utilizing displacement tracking.

Referring to FIG. 18, in such embodiments, the desired actuating arm displacement range is predetermined based on the requirements of the desired application in step 602. Controller 70 applies a power signal having a power signal frequency to piezoelectric stack 100 as has been described above in step 604. Based on the signal from sensor 654-854, controller 70 then determines the actual degree of movement of actuating arm(s) 41 at step 606. If the degree of movement is within the predetermined range, the power signal frequency is maintained. If it is outside the predetermined range, it may be adjusted in step 6010. The process repeats in order to attain and/or maintain the resonant condition of actuator 1. Where the power signal voltage is maintained at a level low enough to prevent mechanical webs 30 from reaching their yield point during resonant operation, this method can be used safely both to enter and to maintain resonance.

It will be understood by those in the art that the phase angle measurements described above provide additional information regarding the direction of the necessary frequency adjustment. Such directional information is not strictly needed, however, as controller 70 can "hunt" for the proper direction by incrementally increasing or decreasing the power signal frequency and monitoring the resulting change in the degree of movement.

It will also be understood by those of ordinary skill in the art that a degree of pre-load placed on piezoelectric stack 100 is desirable and that the degree of preload will impact the characteristics of the sensor signal generated by inline sensors 654-854. Referring to FIG. 8, preload levels may be adjusted by including mechanical adjustment means 21 such that first mounting surface 24' can be moved to apply varying pressure on piezoelectric stack 100.

Just as the embodiments described herein may be used to maintain resonant operation, they may also be used to avoid resonant operation by reversing the methods already described such that controller 70 moves the power signal away from the range of resonant frequency once a threshold phase angle or threshold degree of movement is detected. Where displacement will be used, a maximum actuator arm displacement may be predetermined. Controller 70 may then be adapted to avoid operating actuator 1 in a resonant condition by applying a power signal having a power signal frequency to piezoelectric stack 100, and adjusting the power signal frequency substantially upon determining that the degree of movement exceeds the predetermined maximum actuator arm displacement. This substantially prevents actuator 1 from operating in a resonant condition by changing the power signal frequency at the initial signs of the onset of resonance, thereby safely allowing operation at near resonant frequencies with voltages that would cause mechanical webs 30 to exceed their yield points at resonant frequencies.

As will be understood from the foregoing discussion, it is desirable to have an actuator 1 with a loaded resonant frequency (as indicated by points 414, 434, 474 on FIGS. 14-16) that corresponds to the frequencies demanded by the application. For example, where actuator 1 is applied to driving a compressor, it would be desirable for the loaded resonant frequency of actuator 1 at loads typically generated by the compressor to correspond to efficient speeds of operation for the compressor. For any given actuator 1, that may not be the case. Therefore, also disclosed are methods of adjusting the resonant frequency of a smart material actuator according to the present invention to more closely match the demands of given applications. When discussing adjustment of resonance frequency, the general term 'resonant frequency' is used as opposed to the more specific terms loaded resonant frequency and natural resonant frequency as the methods apply equally to adjusting resonance in both loaded and unloaded conditions.

Figure 11:
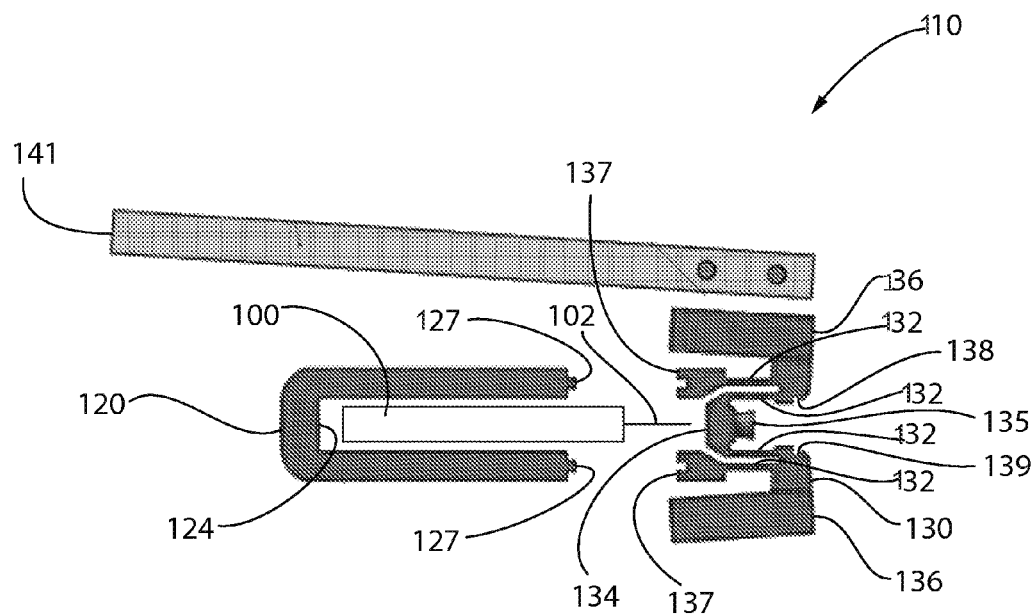
FIG. 11 illustrates a side, exploded view of a preferred embodiment of a mechanical amplifier of an actuator of the present invention having a separate mountable arm.

One method of adjusting the resonant frequency of a smart material actuator involves adjusting the mass of the actuator. FIG. 11 illustrates an embodiment of a mechanical amplifier 110 having a single mountable actuating arm 141 that is adapted for such adjustment. Fixed supporting member 120, mechanical webs 130 and actuating arm 141 are formed of discrete components. As such, the mass of an assembled actuator utilizing mechanical amplifier 110 may be adjusted by replacing components with those made from heavier or lighter materials as necessary to adjust the resonant frequency. More particularly, a desired resonant frequency may be predetermined. Then the actual resonant frequency of an actuator utilizing mechanical amplifier 110 may be determined. If the actual resonant frequency is too low, components of mechanical amplifier 110 may be replace with lower mass components to raise the resonant frequency. If the actual resonant frequency is too high, higher mass components may be substituted to lower that frequency. A particularly convenient component to substitute when adjusting resonant frequency is mountable actuating arm 141. Different arm designs (for example and without limitation solid arms, hollow arms) and arms of different materials (for example and without limitation stainless steel, aluminum, composite, or ceramic) will have different masses, thereby allowing for different resonant frequency adjustments.

Figure 12:
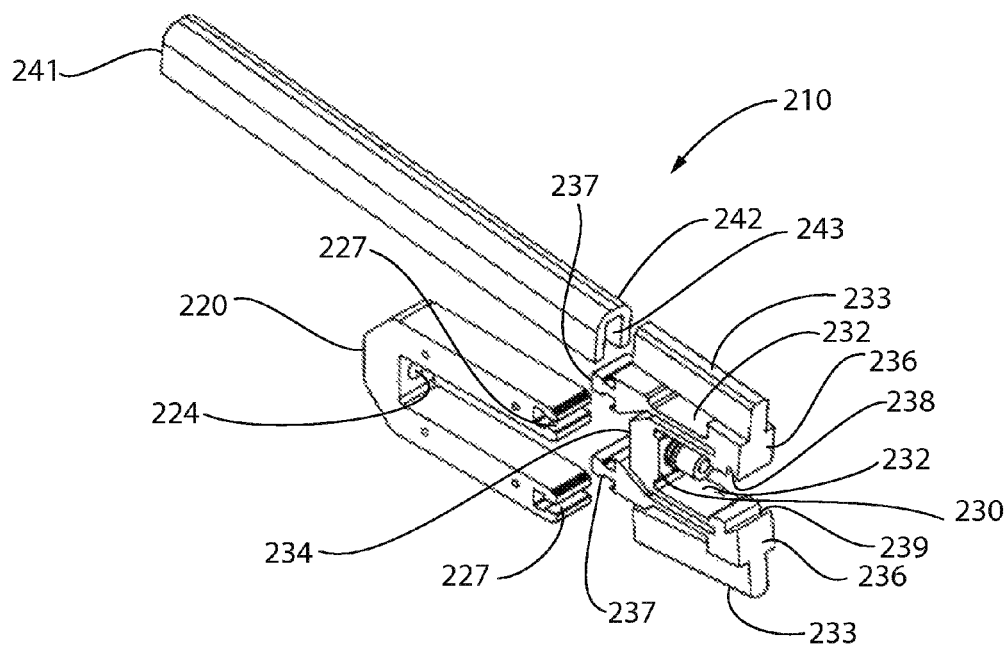
FIG. 12 illustrates a perspective, exploded view of a preferred embodiment of a mechanical amplifier of an actuator of the present invention having a separate mountable arm.

An alternate embodiment of a mechanical amplifier 210 suitable for use with smart material actuators adapted for use with the present invention is illustrated in FIG. 12. In this embodiment, mountable arm 241 is a low mass, channel-shaped arm adapted to attach to amounting point 233 on mechanical webs 230. By selecting arms with fully or partially hollow channels, a variety of mass adjustments may be achieved. Additionally, as illustrated the embodiments of mechanical amplifiers 110, 210 are adapted to have either one or two mountable actuating arms 241, thereby allowing for still more adjustment.

Mechanical amplifiers 110, 210 offer a further method of adjusting resonant frequency. Because mechanical webs 130, 230 are discrete components, it is possible to change the resonant frequency by altering the stiffness of compliant members 132, 232. As with adjusting mass, the first steps are to determine the desired resonant frequency and compare it to the actual resonant frequency. Then the resonant frequency can be raised by replacing mechanical webs 130, 230 with mechanical webs 130, 230 having stiffer compliant members 132, 232. Conversely, the resonant frequency may be lowered by replacing mechanical webs 130, 230 with mechanical webs 130, 230 having compliant members 132, 232 that are less stiff. Stiffness may be adjusted in a variety of manners understood in the art including using different materials, increasing or decreasing the thickness of compliant members 132, 232, or alternatively increasing or decreasing their length. It will also be understood that allowing for mechanical webs 130, 230 with longer compliant members 132, 232 has an additional advantage of increasing the yield point of mechanical webs 130, 230. Increasing the yield point is desirable because it allows for a greater degree of safety by allowing mechanical webs 130, 230 to withstand periods of greater than usual displacement without greatly diminishing the useful lifetime of mechanical webs 130, 230.

Figure 13:
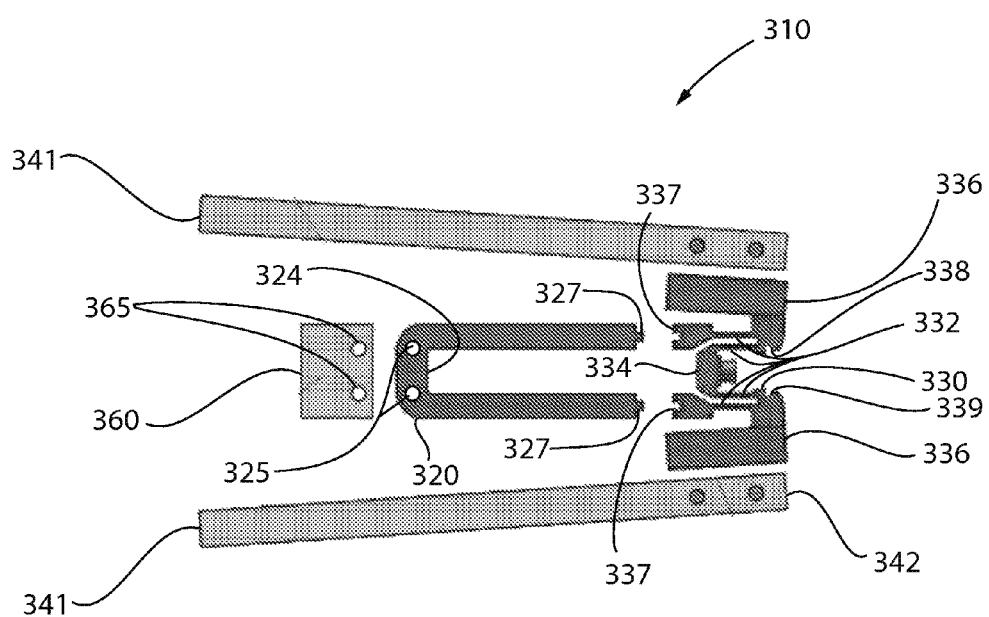
FIG. 13 illustrates a side, exploded view of a preferred embodiment of a mechanical amplifier of an actuator of the present invention having two separate mountable arms and a mounting block adapted to attach to the fixed supporting member.

A further method of adjusting resonant frequency is illustrated with the embodiment of mechanical amplifier 310 illustrated in FIG. 13. Whereas actuators adapted for use in the present invention may conveniently be mounted to a fixed surface on by one mountable actuating arm 341 and a load to be actuated on a second mountable actuating arm 341, other mounting methods are also possible. Changing among such mounting methods will also adjust resonant frequency in practice. In addition to utilizing two mountable actuating arms 341, one attached to a fixed point and the other to an actuated load, it is also possible to directly mount the lower portion of mechanical webs 330 directly to a fixed surface. Alternatively, mounting block 360 may be attached to fixed supporting member 320 with mechanical fasteners passing through holes 365 and 325. Mounting block 360 may then be attached to a fixed location allowing actuating arm(s) 341 to actuate freely. Each different mounting method will typically generate a different resonant frequency, thereby allowing for a further degree of freedom in matching, or tuning, the resonant frequency of an actuator comprising mechanical amplifier 310 to suit the needs of a particular application While the present invention has been described in conjunction with what are presently considered to be the most practical and preferred embodiments, this invention is not limited to those embodiments, but instead is intended to encompass all of the various modifications to, and variations on those embodiments, and all equivalent arrangements, within the scope and spirit of the appended claims, which scope is to be accorded the broadest interpretation permitted under law.

We claim:
1. A smart material actuator apparatus comprising
a smart material actuator having a natural resonant frequency, said smart material actuator comprising
a mechanical amplifier comprising
a substantially rigid fixed supporting member having a first mounting surface,
a mechanical web attached to said fixed supporting member said mechanical web comprising a movable supporting member having a second mounting surface substantially parallel to said first mounting surface and at least one compliant member, and
at least one actuating arm attached to said mechanical web;
said smart material actuator further comprising
a piezoelectric stack affixed between said first mounting surface and said second mounting surface such that substantially upon application of an electrical potential to said piezoelectric stack, said piezoelectric stack expands substantially without angular movement thereby urging said second mounting surface away from said first mounting surface, thereby causing said compliant member to flex, thereby moving said actuating arm; and
a sensor adapted to generate a sensor signal proportional to the degree of movement of said actuating arm;
said smart material actuator apparatus further comprising
a controller electrically connected to said piezoelectric stack and said sensor, said controller being adapted
to apply a power signal to said piezoelectric stack, said power signal having a power signal frequency and a power signal voltage;

to determine a phase angle between said power signal and said sensor signal and compare said phase angle to a predetermined phase angle range;

to adjust said power signal frequency in a first direction substantially upon determining said phase angle to be below said predetermined range;

adjusting said power signal frequency in a second direction opposite to said first direction substantially upon determining said phase angle to be above said predetermined range;

said predetermined range comprising the natural resonance phase angle;

whereby said controller is adapted to operate said smart material actuator in a resonant condition.

2. The smart material actuator apparatus of claim 1 wherein said compliant members have a predetermined yield threshold; and said controller is further adapted to maintain said power signal voltage below a predetermined voltage level such that said smart material actuator may operate in said resonant condition without said degree of movement causing said compliant members to exceed said yield threshold.

3. The smart material actuator apparatus of claim 1 wherein said controller is further adapted to increase said power signal voltage substantially upon determining said phase angle is within said predetermined phase angle range and said degree of movement is below a predetermined movement lower bound, and decrease said power signal voltage substantially upon determining said phase angle is within said predetermined phase angle range and said degree of movement is above a predetermined movement upper bound.

4. The smart material actuator apparatus of claim 1 wherein said controller adjusts said power signal frequency in increments proportional to the difference between said phase angle and said natural resonance phase angle.

5. The smart material apparatus of claim 1 wherein said sensor is affixed between said actuating arm and said fixed supporting member.

6. The smart material apparatus of claim 1 further comprising a second actuating arm attached to said mechanical web and said sensor is affixed between said actuating arm and said second actuating arm.

7. The smart material apparatus of claim 1 wherein said mechanical web comprises an upper web attachment point and a lower web attachment point and said sensor is affixed between said upper web attachment point and said lower web attachment point.

8. The smart material apparatus of claim 1 wherein said sensor is affixed to said actuating arm.

9. The smart material actuator apparatus of claim 1 wherein said sensor is affixed to said mechanical web.

10. The smart material actuator apparatus of claim 1 wherein said sensor is selected from the set of foil-type strain gauge, piezo bender, capacitive strain gauge, optical sensor, Hall effect sensor, piezoelectric stack, single layer piezo crystal, piezo variable voltage sensor, and accelerometer.

11. A method of operating a smart material actuator apparatus in a resonant condition, said smart material actuator apparatus comprising a smart material actuator having a natural resonant frequency, said smart material actuator comprising a mechanical amplifier comprising a substantially rigid fixed supporting member having a first mounting surface, a mechanical web attached to said fixed supporting member said mechanical web comprising a movable supporting member having a second mounting surface substantially parallel to said first mounting surface and at least one compliant member, and at least one actuating arm attached to said mechanical web;

said smart material actuator further comprising a piezoelectric stack affixed between said first mounting surface and said second mounting surface such that substantially upon application of an electrical potential to said piezoelectric stack, said piezoelectric stack expands substantially without angular movement thereby urging said second mounting surface away from said first mounting surface, thereby causing said compliant member to flex, thereby moving said actuating arm; and a sensor adapted to generate a sensor signal proportional to the degree of movement of said actuating arm;

said method comprising the steps of applying a power signal to said piezoelectric stack, said power signal having a power signal frequency and a power signal voltage;

determining a phase angle between said power signal and said sensor signal and comparing said phase angle to a predetermined phase angle range wherein said predetermined phase angle range includes the natural resonance phase angle;

adjusting said power signal frequency in a first direction substantially upon determining said phase angle to be below said predetermined phase angle range;

adjusting said power signal frequency in a second direction opposite to said first direction substantially upon determining said phase angle to be above said predetermined phase angle range;

whereby said controller is adapted to operate said actuator in a resonant condition.

12. The method of claim 11 wherein said compliant members have a predetermined yield threshold; and said steps further comprise maintaining said power signal voltage below a predetermined voltage level such that said smart material actuator may operate in said resonant condition without said degree of movement causing said compliant members to exceed said yield threshold.

13. The method of claim 11 further comprising the steps of increasing said power signal voltage substantially upon determining that said phase angle is within said predetermined phase angle range and that said degree of movement is below a predetermined movement lower bound, and decreasing said power signal voltage substantially upon determining that said phase angle is within said predetermined phase angle range and that said degree of movement is above a predetermined movement upper bound.

14. The method of claim 11 further comprising the steps of adjusting said power signal frequency in increments proportional to the difference between said phase angle and said natural resonance phase angle.

15. A method of operating a smart material actuator apparatus in a resonant condition, said smart material actuator apparatus comprising a smart material actuator having a loaded resonant frequency, said smart material actuator comprising a mechanical amplifier comprising a substantially rigid fixed supporting member having a first mounting surface, a mechanical web attached to said fixed supporting member said mechanical web comprising a movable supporting member having a second mounting surface substantially parallel to said first mounting surface and at least one compliant member, and at least one actuating arm attached to said mechanical web;

said smart material actuator further comprising a piezoelectric stack affixed between said first mounting surface and said second mounting surface such that substantially upon application of an electrical potential to said piezoelectric stack, said piezoelectric stack expands substantially without angular movement thereby urging said second mounting surface away from said first mounting surface, thereby causing said compliant member to flex, thereby moving said actuating arm; and a sensor adapted to generate a sensor signal proportional to the degree of movement of said actuating arm;

said method comprising the steps of predetermining an actuating arm displacement range;

determining said degree of movement;

adjusting a power signal frequency to maintain said degree of movement within said actuator arm displacement range;

wherein said degree of movement of said actuator arm is within said actuating arm displacement range substantially upon said power signal frequency equaling said loaded resonant frequency whereby said smart material actuator is maintained in a resonant condition and said degree of movement does not exceed the upper bound of said actuator arm displacement range.

16. The method of claim 15 wherein said sensor is affixed between said piezoelectric stack and said movable supporting member.

17. The method of claim 15 wherein said sensor is affixed within said piezoelectric stack.

18. The method of claim 15 wherein said sensor is affixed between said piezoelectric stack and said first mounting surface.

19. The method of claim 15 wherein said sensor comprises a piezoelectric crystal electrically isolated from said piezoelectric stack.

20. The method of claim 15 wherein said sensor is selected from the set of foil-type strain gauge, piezo bender, capacitive strain gauge, optical sensor, Hall effect sensor, piezoelectric stack, single layer piezoelectric stack, multilayer piezoelectric stack, piezo variable voltage sensor, and accelerometer.

21. A method of operating a smart material actuator apparatus to avoid a resonant condition, said smart material actuator apparatus comprising (a) a smart material actuator having a loaded resonant frequency, said smart material actuator comprising a mechanical amplifier comprising a substantially rigid fixed supporting member having a first mounting surface, a mechanical web attached to said fixed supporting member said mechanical web comprising a movable supporting member having a second mounting surface substantially parallel to said first mounting surface and at least one compliant member, and at least one actuating arm attached to said mechanical web;

said smart material actuator further comprising a piezoelectric stack affixed between said first mounting surface and said second mounting surface such that substantially upon application of an electrical potential to said piezoelectric stack, said piezoelectric stack expands substantially without angular movement thereby urging said second mounting surface away from said first mounting surface, thereby causing said compliant member to flex, thereby moving said actuating arm; and a sensor adapted to generate a sensor signal proportional to the degree of movement of said actuating arm;

said method comprising the steps of predetermining a maximum actuator arm displacement;

applying a power signal having a power signal frequency to said piezoelectric stack adjusting said power signal frequency substantially upon said degree of movement exceeding said maximum actuator arm displacement;

whereby said smart material actuator is prevented from operating in a resonant condition.

22. A method of adjusting the resonant frequency of a smart material actuator, said smart material actuator comprising a mechanical amplifier comprising a substantially rigid fixed supporting member having a first mounting surface, a mechanical web attached to said fixed supporting member said mechanical web comprising a movable supporting member having a second mounting surface substantially parallel to said first mounting surface and at least one compliant member, and at least one actuating arm attached to said mechanical web;

said smart material actuator further comprising a piezoelectric stack affixed between said first mounting surface and said second mounting surface such that substantially upon application of an electrical potential to said piezoelectric stack, said piezoelectric stack expands substantially without angular movement thereby urging said second mounting surface away from said first mounting surface, thereby causing said compliant member to flex, thereby moving said actuating arm;

said method comprising the steps determining a desired resonant frequency of said smart material actuator;

determining the actual resonant frequency of said smart material actuator, and adjusting the mass of said smart material actuator to change said actual resonant frequency.

23. the method of claim 22 wherein said step of adjusting the mass of said smart material actuator to change said actual resonant frequency comprises the steps of removing at least one said actuating arm; and attaching a replacement actuating arm having a different mass.

24. A method of adjusting the resonant frequency of a smart material actuator said smart material actuator comprising a mechanical amplifier comprising a substantially rigid fixed supporting member having a first mounting surface, a mechanical web attached to said fixed supporting member said mechanical web comprising a movable supporting member having a second mounting surface substantially parallel to said first mounting surface and at least one compliant member, and at least one actuating arm attached to said mechanical web;

said smart material actuator further comprising a piezoelectric stack affixed between said first mounting surface and said second mounting surface such that substantially upon application of an electrical potential to said piezoelectric stack, said piezoelectric stack expands substantially without angular movement thereby urging said second mounting surface away from said first mounting surface, thereby causing said compliant member to flex, thereby moving said actuating arm;

said method comprising the steps
- determining a desired resonant frequency of said smart material actuator;
- determining the actual resonant frequency of said smart material actuator, and
- adjusting the stiffness of at least one said compliant member of said mechanical web actuator to change said actual resonant frequency.

25. A method of adjusting the resonant frequency of a smart material actuator having a natural resonant frequency, said smart material actuator comprising a mechanical amplifier comprising
- a substantially rigid fixed supporting member having a first mounting surface,
- a mechanical web attached to said fixed supporting member said mechanical web comprising a movable supporting member having a second mounting surface substantially parallel to said first mounting surface and at least one compliant member, and
- at least one actuating arm attached to said mechanical web;

said smart material actuator further comprising
a piezoelectric stack affixed between said first mounting surface and said second mounting surface such that substantially upon application of an electrical potential to said piezoelectric stack, said piezoelectric stack expands substantially without angular movement thereby urging said second mounting surface away from said first mounting surface, thereby causing said compliant member to flex, thereby moving said actuating arm;

said method comprising the steps of
- removing said actuating arm,
- selecting a replacement actuating arm, and
- mounting said replacement actuating arm on said mechanical web.

26. The method of claim 25 wherein said steps further comprise selecting said replacement actuating arm such that said replacement actuating arm has a lower mass than said removed actuating arm, whereby said resonant frequency is increased.

27. The method of claim 25 wherein said steps further comprise selecting said replacement actuating arm such that said replacement actuating arm has a higher mass than said removed actuating arm, whereby said resonant frequency is decreased.

* * * * *